(12) United States Patent
Hollis, Jr. et al.

(10) Patent No.: US 6,175,169 B1
(45) Date of Patent: Jan. 16, 2001

(54) CLOSED-LOOP PLANAR LINEAR MOTOR WITH INTEGRAL MONOLITHIC THREE-DEGREE-OF-FREEDOM AC-MAGNETIC POSITION/ORIENTATION SENSOR

(75) Inventors: Ralph L. Hollis, Jr., 215 Springhouse Ln., Pittsburgh, PA (US) 15238; Zachary J. Butler, Pittsburgh, PA (US); Alfred A. Rizzi, Pittsburgh, PA (US); Arthur E. Quard, III, Pittsburgh, PA (US)

(73) Assignee: Ralph L. Hollis, Jr., Pittsburgh, PA (US)

( * ) Notice: Under 35 U.S.C. 154(b), the term of this patent shall be extended for 0 days.

(21) Appl. No.: 09/303,874

(22) Filed: May 3, 1999

Related U.S. Application Data
(60) Provisional application No. 60/084,866, filed on May 8, 1998.

(51) Int. Cl.[7] .............................. H02K 41/00; G05B 11/00
(52) U.S. Cl. ........................ 310/12; 318/135; 414/935; 74/471 XY
(58) Field of Search ................................ 310/12, 13, 14; 33/1 M; 74/471 XY, 479.01; 108/137, 138; 29/760, 721, 785; 414/935, 936; 318/135

(56) References Cited

U.S. PATENT DOCUMENTS

| | | | |
|---|---|---|---|
| 3,376,578 | 4/1968 | Sawyer | 310/13 X |
| 3,735,231 | 5/1973 | Sawyer | 318/687 |
| 3,857,078 | 12/1974 | Sawyer | 318/608 |
| 4,823,062 | 4/1989 | Hoffman et al. | 318/687 |
| 4,893,071 | 1/1990 | Miller | 324/660 |
| 5,324,934 | 6/1994 | Clark | 250/231.3 |
| 5,434,504 | 7/1995 | Hollis et al. | 324/207.17 |
| 5,763,966 | 6/1998 | Hinds | 310/12 |
| 5,818,039 | 10/1998 | Lampson | 250/231.13 |
| 5,828,142 | 10/1998 | Simpson | 310/12 |
| 5,860,208 | 1/1999 | Nomura | 29/740 |
| 5,886,432 | 3/1999 | Markle | 310/12 |

OTHER PUBLICATIONS

Scheinman 1987 "Robot World A Multiple Robot Vision Guided Assembly System" (Month unknown).
Lilehthal Apr. 1988 "A Flexible Manufacturing Workstation".
Anon. May 1989 "Speed and Precision from Novel Assembly Robot".

(List continued on next page.)

*Primary Examiner*—Thomas M. Dougherty
*Assistant Examiner*—Judson H. Jones

(57) ABSTRACT

The invention discloses a closed loop planar linear motor which includes a stationary stator (or platen) of arbitrary extent, and a moving forcer which is a single rigid body that can move over the planar stator surface on an air bearing with high speed and high precision in two orthogonal translational directions and a small rotation (or combinations thereof). An important distinguishing feature is a monolithic position and orientation sensor based on alternating current (AC) magnetic techniques which is an integral part of the forcer and occupies otherwise unused space in the forcer body. Also incorporated within the forcer is a special electronic processing element which converts weak AC signals from the sensor into usable high precision position and orientation information relative to the stator surface. A unique controller which is part of the closed-loop linear motor acts to combine information from the AC magnetic sensor with input from a user to provide precise, high-performance closed-loop control of the forcer, thereby enabling the forcer to be positioned with sub-micrometer precision and oriented with sub-millidegree precision on the stator surface. Additionally, owing to its closed-loop nature, the forcer can maintain its position and orientation even in the presence of disturbance forces and torques, and can emulate the operation of a mechanical spring and damper.

11 Claims, 14 Drawing Sheets

OTHER PUBLICATIONS

Brennemann Jun. 1992 "Magnetic Sensor for 2D Linear Stepping Motor".

Nicolson Jul. 1993 Optical Position Sensing for Closed–Loop Control of Linear.

Payne 1993 "Robot World—Unrolled Motors Turn Assembly on its Head" (Month unknown).

Ish–Shalon 1994 "Sawyer Sensor for Planar Motion Systems" (Month unknown).

Brennemann Aug. 1995 "Magnetic and Optical–Fluorescence Position Sensing for Planar Linear Motors".

CLOSED-LOOP PLANAR LINEAR MOTOR WITH INTEGRAL MONOLITHIC THREE-DEGREE-OF-FREEDOM AC-MAGNETIC POSITION/ORIENTATION SENSOR

RELATED APPLICATION

This application claims the benefit of Provisional Patent Application Ser. #60/084,866, filed May 8, 1998.

BACKGROUND

1. Field of the Invention

The present invention relates generally to sensing and control of electric motors, and more particularly, to precise sensing and control of the position and orientation of a planar linear motor incorporating a monolithic planar alternating current (AC) magnetic sensor.

2. Description of Prior Art

Motors that can move in a straight line (linear motors) are well known in the art. Motors that can move freely in the plane are less well known, but several examples exist. For example, the planar linear motor (henceforth referred to simply as a planar motor) due to Sawyer (U.S. Pat. No. 3,376,578) can provide linear motion in two mutually orthogonal directions in the plane as well as a small rotation in the plane.

Such a planar motor generally combines four linear-motor sections into one forcer assembly that is capable of producing forces and torques in the plane. The forcer is magnetically attracted to a patterned iron platen surface while being forced away from the surface by an air bearing film; the equilibrium separation being typically 10 to 15 $\mu$m. The motor sections have fine teeth [typically 0.5 mm (0.020 in.) wide on a 1.0 mm (0.040 in.) pitch] and the platen has a two-dimensional array of square teeth of corresponding width and pitch. After chemical or physical machining, the platen surface is planarized using epoxy to form the air-bearing surface. The combined motor sections making up the forcer ride above (or hang below) the platen (stator) surface, and typically operate on a flux-steering principle in open-loop microstepping mode. That is, a string of pulses from the control computer serves to increment counters which set proportional currents in the drive coils which, in turn, move the stable magnetic equilibrium point which, in turn, provides a force which moves the motor forward. These developments are chiefly due to Sawyer, and date from the late 1960s.

Planar motors have many desirable attributes. Commercial systems such as RobotWorld (V. Scheinman, "Robot-World: a multiple robot vision guided assembly system," in *Robotics Research, the Fourth International Symposium*, Santa Cruz Calif., 1987, pp. 23–27, and "RobotWorld—unrolled motors turn assembly on its head," *Industrial Robot*, Vol. 20, No. 1, 1993, pp. 28–31) use forcers carrying vertical and rotational axes and vision cameras suspended from a platen ceiling for automated assembly. Similar systems have been developed by AT&T (P. F. Lilienthal, et al., "A flexible manufacturing workstation," *AT&T Technical Journal*, 1998, pp. 5–14) and Megamation (Anon., "Speed and precision from novel assembly robot," *Assembly Automation*, Vol. 9, No. 2, 1989, pp. 85–87) for a wide variety of automation applications such as the placement of surface-mount components on circuit boards (B. D. Hoffman, "The use of 2-D linear motors in surface mount technology," *Proc. 5th Int'l SAMPE Electronics Conference*, 1991, pp. 141–151).

While offering many benefits, current planar motion systems are severely limited because of their open-loop stepping operation which prevents the achievement of maximum potential performance. To help ensure against loss of synchrony (missing steps), only two-thirds to three-fourths of the available force margin is used, reducing the forcer's potential maximum acceleration and velocity. Even so, the forcer motors remain susceptible to loss of synchrony if large enough unanticipated external forces are acting. Additionally, settling times after moves are longer than desirable and there is no way to reject low-frequency external disturbances. The forcer has only moderate stiffness requiring high power dissipation when holding a position.

Many have recognized that these problems can be solved or considerably reduced in severity by incorporating a suitable position sensor that can accurately measure the relative displacements of forcer and platen at high enough bandwidth to be used for servo control for greatly improved performance. Among the possible sensing strategies are laser interferometry, tracking from light sources attached to the forcer, optical sensing of teeth in the platen, capacitive sensing of teeth, and magnetic sensing of teeth.

Interferometric or other optical tracking techniques are expensive and run into trouble when multiple forcers are used in a cluttered environment. On the other hand, sensors which are self contained and can be mounted on or incorporated into the forcer would appear to be the most desirable. Such sensors could use either magnetic, capacitive or optical principles to generate electrical output when the forcer is driven over the platen array. The output signals, either pulses or continuous waveforms, would correspond to the platen array dimensions. These could be used for closed-loop coarse distance control by pulse counting and/or intra-tooth fine control by interpolating the analog waveform.

Sawyer himself recognized the desirability of a platen tooth sensor and patented a method based on magnetic induction (U.S. Pat. No. 3,735,231). One embodiment of the sensor in U.S. Pat. No. 3,735,231 includes a four pole magnetic member having a pair of sense windings which can be in the form of a printed circuit board disposed on non-adjacent poles at the exposed end of the poles. The pair of windings provide outputs which are a periodic function of the head relative to the platen along a single axis. The patent does not teach control of the motor from the sensor signals.

U.S. Pat. No. 3,857,078 to Sawyer discloses a closed loop planar motor using magnetic sensing. For detection along each axis, two pickoff assemblies are utilized. Each pickoff includes two magnetic cores joined by a magnetic cross piece having a drive coil wrapped around it. Each magnetic core has two poles, each with three teeth. The two poles of one core are spaced in a phase quadrature relationship with the two poles of the other core. The flux in each core varies with the linear positioning of the pickoff relative to the platen and the fluxes in the two cores are in a quadrature relationship with each other. A sense coil is wound around an upper horizontal portion of each core member. The two sense coils provide quadrature related output signals having periodic relationships in accordance with the actual displacement of the head along the platen. This sensor, however, suffers from the disadvantage that since the magnetic path is not symmetrical on both sides of the drive coil the outputs have a large common mode (bias field) component which is not cancelled.

A magnetic sensing technique is disclosed by Brennemann, et al., ("Magnetic sensor for 2-D linear stepper motor," *IBM Technical Disclosure Bulletin*, Vol. 35, No. 1B, June 1992). This sensor is an AC magnetic sensor based on self inductance of coils integrated with a planar motor. The sensor includes four linearly shaped poles, each having a plurality of teeth. Two poles on the left are separated from the two poles on the right by a magnetic spacer. A sense coil (L1–L4) is wound around each of the poles. The sensor for each axis consists of eight coils wound on eight poles. Four poles are positioned in one quadrant of the forcer and four are positioned in the diagonally opposite quadrant. The inductance of a first sense coil L1 is at a maximum when the inductance of a second coil L2 is at a minimum and vice-versa. The sense coils L3 and L4 are in phase quadrature with the coils L1 and L2. Each four-pole sensor produces quadrature related output voltages which vary sinusoidally with forcer displacement along a single axis of the platen. The sensors can be used to measure displacement along one of two axes and rotation about the z axis. The above sensors are, however, relatively complex to make and use, expensive to manufacture, difficult to shield from unwanted external fields and have a relatively small signal. There is no discussion of motor control based on such signals.

U.S. Pat. No. 5,434,504 to Hollis, et al. discloses a position sensor for planar motors using inductive coupling to the platen teeth through planar drive and planar sense coils. In one embodiment, the sensor includes first and second magnetic members having teeth disposed relative to the teeth on the platen. A single turn planar drive winding is disposed around at least one of the teeth of the first and second magnetic members for producing a first and a second drive flux within each of the magnetic members. A single turn planar sense winding is disposed around at least one of the teeth of the first and second magnetic members for generating first and second outputs which are a periodic function of the position of the sensor relative to the platen. In another embodiment, the sensor includes two magnetic members each having four pole pieces. A drive winding is disposed on each member for establishing first and second fluxes in each member which are symmetrical about a center of each member. A sense winding is wound around the center poles of each member for measuring the relative flux therein and producing an output which is a periodic function of the position relative to the platen. A disadvantage is the lack of an ability to measure rotation in the plane with a single sensor substrate. Another disadvantage is the difficulty during manufacturing of aligning multiple sensor substrates in a single forcer. The patent does not incorporate a control element for control of the planar motor from the derived signals.

A position sensing technique based on sensing capacitance between patterned electrodes and the platen teeth is described in U.S. Pat. No. 4,893,071 to Miller. In one embodiment, chevron-shaped electrodes couple electrostatically to the platen teeth, from which position signals for control can be derived. A disadvantage of this approach is capacitance changes due to changing humidity and contamination between the electrodes and the platen surface.

An optical sensing technique using colored stripes similar to that used by an optical mouse device was patented by Hoffman and Pollack (U.S. Pat. No. 4,823,062). In this technique, optical filters are used to differentiate between stripes in orthogonal directions. A disadvantage of this approach is the need to interpose a pattern of colored stripes in the very thin air bearing that exists between the platen and the forcer, leading to reduced magnetic fields (or reduced air gap, requiring tighter manufacturing tolerances). Additionally, there are manufacturing challenges in producing large areas of precision made stripes and their subsequent bonding to the platen surface.

Another optical technique based on reflected light was developed by Nicolson, et al., ("Optical sensing for closed-loop control of linear stepper motors," *Proc. Int'l Conf. on Advanced Mechatronics*, Tokyo, Japan, August 1993). This technique uses light produced by light emitting diodes (LEDs) shining through slit-shaped masks and viewed by photodiode detectors to produce quadrature position signals from the platen teeth. A disadvantage is noisiness of the signals derived from the reflected light due to random scratches, dirt, and corrosion on the top surfaces of the platen teeth.

U.S. Pat. No. 5,324,934 to Clark discloses the use of fiber optics to determine the position, velocity, and direction of movement of a planar motor. There are a pair of channels, each one of which has two bundles of optical fiber. A first end of the optical fiber of each of the bundles is disposed within a narrow elongated slit. One of the bundles conveys light directed upon the opposite end of the bundles to the platen surface adjacent to the slit. The remaining bundles convey light reflected from the surface to a photodetector. The slits are spaced appropriately relative to the platen tooth pitch spacing so that both position and direction of motion can be ascertained. A disadvantage is complexity of manufacture and susceptibility to scratches and contamination.

U.S. Pat. No. 5,818,039 to Lampson describes an optical reflectance sensor which uses a charge-coupled device (CCD) detector to sense motion in the plane. A plurality of detectors is mounted onto a forcer to sense motion along a particular direction, with the detector being insensitive to motion along an orthogonal direction. Disadvantages include the complexity of optically coupling the CCD detectors through optical beam splitters and cylindrical lenses with its attendant bulkiness and cost. As with other optical methods, there is susceptibility to corrosion, dirt, and contamination.

Another optical technique was proposed by Brennemann, et al., ("An optical means of sensing position of a Sawyer motor on a magnetic grid surface," *IBM Technical Disclosure Bulletin*, vol. 37, pp. 375–378, May, 1994). This method is an improvement on conventional optical sensing of platen teeth. It uses a fluorescent dye embedded in the epoxy backfill between the platen teeth. When the dye is illuminated through slits with light of wavelength $\lambda_1$, it re-radiates light at a wavelength $\lambda_2 > \lambda_1$. By using optical filters to remove the reflected component $\lambda_1$, only the component $\lambda_2$ is detected, eliminating variations in reflectance due to scratches and contamination. Brennemann and Hollis published a paper ("Magnetic and optical-fluorescence position sensing for planar linear motors," *Int'l Conf. on Intelligent Robots and Systems*, Vol. III, August, 1995, pp. 101–107) making detailed comparisons between optical and magnetic methods.

All of the sensors and control methods for planar motors heretofore described suffer from a number of disadvantages:

(a) Sensors based on optical reflectance techniques are susceptible to scratches, dirt, and corrosion on the top surface of the platen. These sensors measure the perceived optical position of the platen teeth which may or may not represent the true position of the teeth. As a result, position signals for use by a control system are corrupted by spatial noise, i.e. as the planar motor carrying the sensing head moves across the regular teeth of the platen surface, the perceived position signals will be irregular to the extent that contamination effecting the optical signal is present.

(b) Sensors based on optical fluorescence techniques are bulky and difficult to integrate within a planar motor structure since the necessary optical components must occupy a three-dimensional extent. Additionally, these sensors cannot be used on conventional platen surfaces which lack a fluorescent dye. Incorporation of dye into the epoxy backfill of a platen surface requires an additional manufacturing step. Also, it is difficult to provide a uniform concentration of dye, and failing to do so introduces unwanted spatial noise in the position signals.

(c) Sensors based on capacitance techniques require incorporating shielded electrode arrays into the planar motor structure. These electrode arrays must be constructed in ways to eliminate common mode signals resulting from changes of flying height of the planar motor. The capacitance signal is subject to changes in humidity in the environment and to contamination, e.g dielectric films on the platen surface. These considerations make it difficult to provide reliable sensing and control.

(d) Sensors based on magnetic techniques using large three-dimensional core structures have the advantage that they are measuring the planar motor position with respect to intrinsically magnetic objects, namely the ferromagnetic teeth of the platen. On the other hand, most of the magnetic sensors described in the prior art use structures that are bulky, difficult to manufacture, and difficult to integrate with a planar motor. These sensors are also difficult to shield from unwanted magnetic interference, stemming chiefly from electric currents in adjacent motor windings. Signals from these sensors have not proved suitable for precise control of position and orientation of planar motors.

(e) Sensors based on magnetic techniques using small planar core structures have the advantage as in (d) that they are measuring the planar motor position with respect to intrinsically magnetic objects, namely the ferromagnetic teeth of the platen. On the other hand, they are difficult to integrate with a planar motor and require difficult precise alignment during manufacture.

What is needed is a platen sensor which is not susceptible to scratches, dirt, or other film contamination and which can readily be integrated with existing planar motor technology to provide precise lateral position as well as rotational orientation on the platen surface coupled with effective means of control so as to affect precise closed-loop planar motion.

OBJECTS AND ADVANTAGES

Accordingly, several objects and advantages of the present invention are:

A precision closed-loop planar motor with features including:

(a) an integrated monolithic sensor that is insensitive to scratches which may be present on the top surface of the platen teeth, corrosion of the top surface of the teeth, or other contaminating films which may be present and which would adversely effect an optical signal, and will therefore provide high quality position signals for precise closed-loop control;

(b) an integrated monolithic sensor that does not require the use of special, non-standard platen surfaces;

(c) an integrated monolithic sensor that is unaffected by humidity or dielectric film contaminants on the platen surface;

(d) an integrated monolithic sensor that is small enough and flat enough to readily be integrable with existing planar motor designs, occupying only space which is presently unused in such motors;

(e) an integrated monolithic sensor that is comprised of a single monolithic planar part, easily manufacturable, and capable of measuring all degrees of freedom in the plane (orthogonal directions of translation as well as a small rotation), providing precise signals for closed-loop control;

(f) an electronic processing unit of special design such that signals from the integrated monolithic sensor can be measured with extreme (sub micrometer) precision; and (g) a controller of special design that utilizes the processed precise position and orientation signals from the integrated sensor to provide precisely controlled motion in the plane.

Further objects and advantages of our invention will become apparent from a consideration of the drawings and ensuing description.

SUMMARY OF THE INVENTION

A closed-loop planar motor forcer comprising a monolithic integrated AC magnetic position and orientation sensor, electronic signal processing, and controller, enabling the forcer to execute precise motion in translation in two orthogonal directions, and small rotations in the plane.

A closed-loop planar motor forcer incorporating a monolithic integrated AC magnetic position and orientation sensor of a physical form which allows it to be integrated in otherwise unused space in the forcer.

A closed-loop planar motor forcer incorporating a monolithic integrated AC magnetic position and orientation sensor comprised of a single planar magnetic substrate incorporating planar drive and sense windings and capable of providing precise position and orientation signals.

BRIEF DESCRIPTION OF THE DRAWINGS

The features of the invention believed to be novel and the elements characteristic of the invention are set forth with particularity in the appended claims. The invention itself, however, both as to organization and method of operation, may best be understood by reference to the detailed description which follows taken in conjunction with the accompanying drawings in which:

DETAILED DESCRIPTION OF THE INVENTION—FIGS. 1A, 1B, 2, 3A, 3B, 4–7, and 9

Figure 1A:
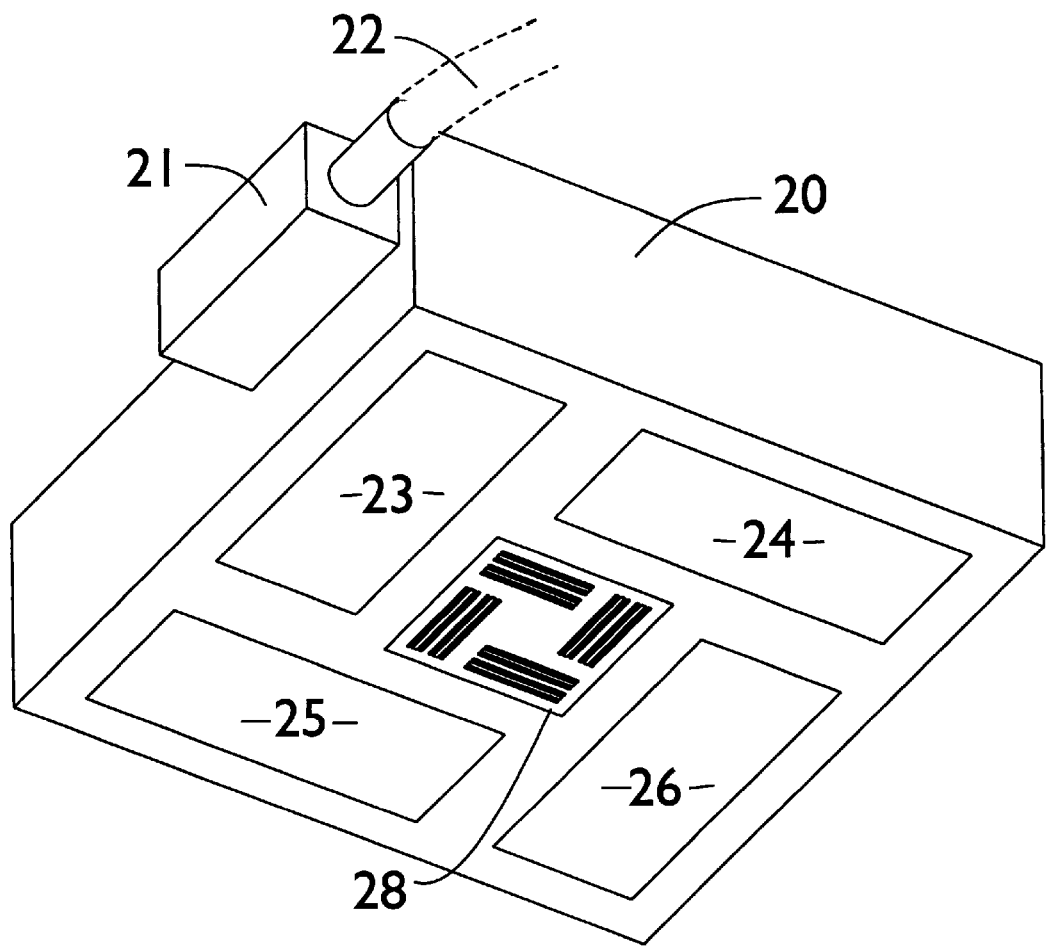
FIG. 1A shows a bottom view of the closed-loop planar linear motor.
Figure 1B:
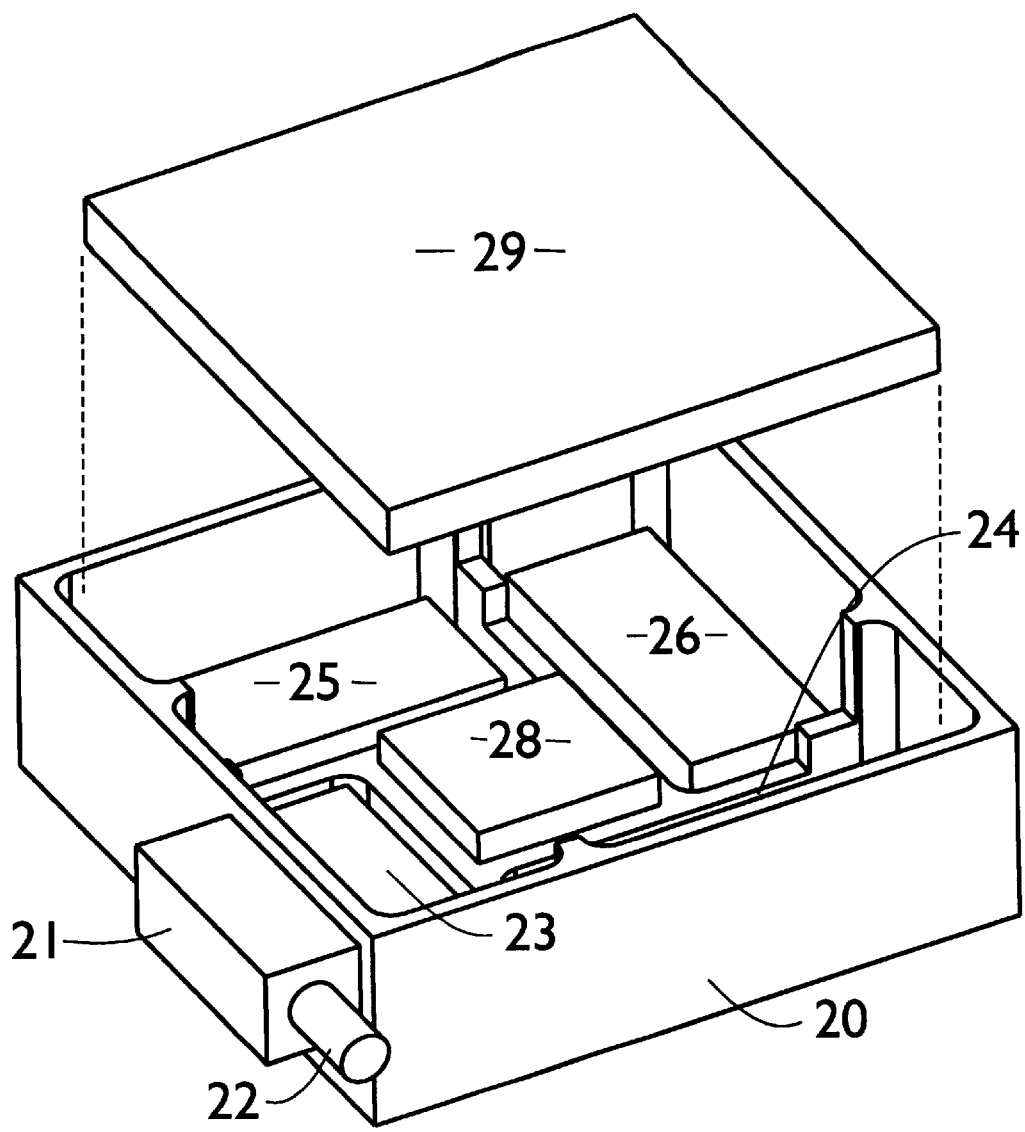
FIG. 1B shows an overhead view of the closed-loop planar linear motor.

Referring to FIGS. 1A and 1B, there is an overall view of the closed-loop planar motor with integral AC magnetic position/orientation sensor.

FIG. 1A shows a bottom view of the hardware part of a preferred embodiment showing a nonmagnetic housing 20 whereon an electrical connector 21 is mounted. Flexible cable (or tether) 22 attached to connector 21 serves to conduct electrical signals to and from a computer, along with a supply of air for an air bearing surface comprised jointly of the bottom surfaces of housing 20 and elements 23–26 and 28. Toothed linear motor segments 23–26 provide electromotive force along directions parallel to the sides of housing 20. All of the elements 20–26 are well known in the art and together constitute what is commonly known as the moving part of a "planar linear motor," or "forcer" or "Sawyer" motor, after its inventor. We refer to the combination of a forcer and its platen (stator) simply as a planar motor. Planar motor forcers operate on a flat iron surface, or "platen" in which an array of small square posts has been formed on a regular grid. Typically, the post dimensions are 0.020 in.×0.020 in., on a pitch spacing of 0.040 in.×0.040 in. Spaces between the posts are filled with a non-magnetic material. To the planar motor heretofore described, integral AC magnetic position/orientation sensor 28 is incorporated into housing 20 at a central location.

FIG. 1B shows an overhead view of the hardware part of the closed-loop planar motor forcer showing the upper extent of the motor segments 23–26 and integral AC magnetic position/orientation sensor 28. Motor current wiring from 23–26 (not shown) collect at connector 21 and are directed through tether 22 to conventional electrical pulse width modulation (PWM) drive circuitry located elsewhere. Electronic circuit board 29, preferably contained within housing 20, connects with sensor 28. Output wires from board 29 (not shown) are connected to the computer by way of connector 21 and thence through tether 22.

Figure 2:
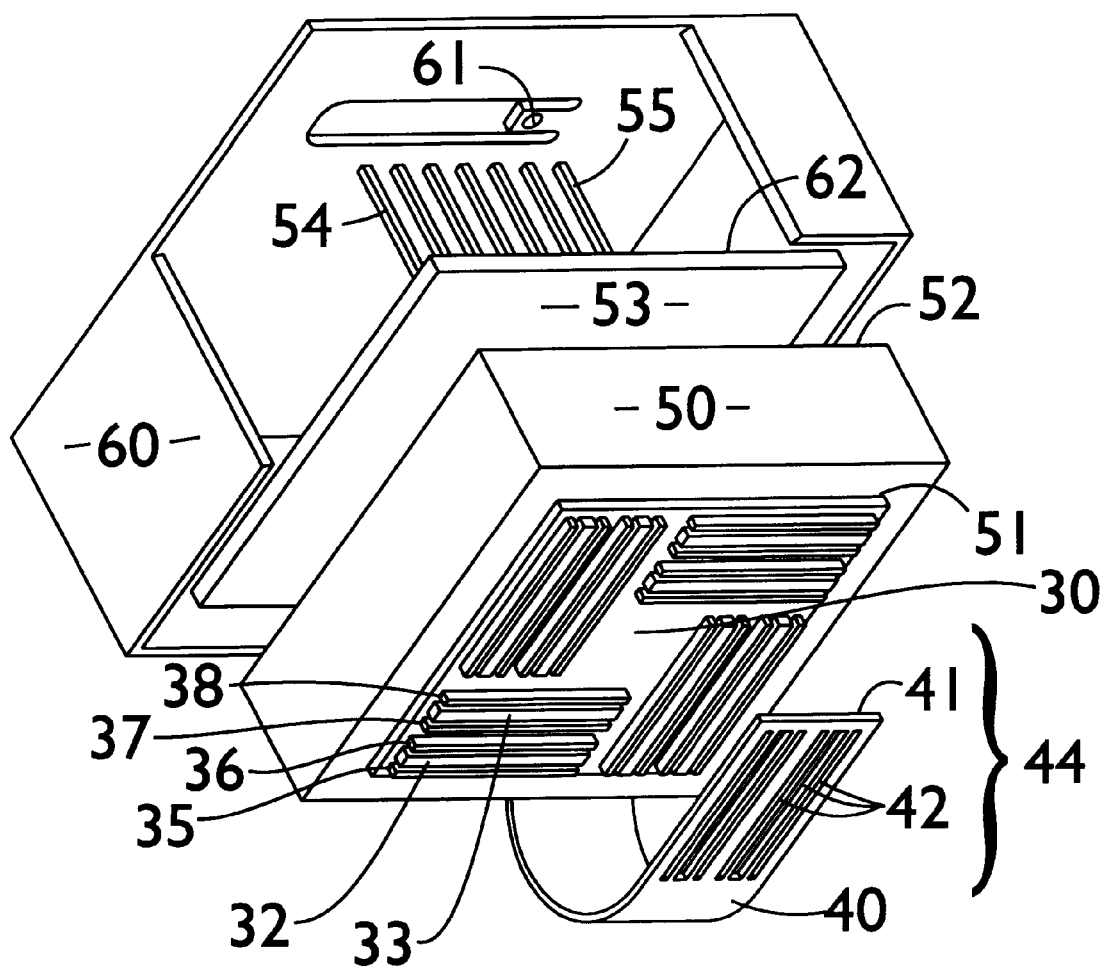
FIG. 2 shows an exploded view of the integral magnetic position/orientation sensor.

FIG. 2 shows a detailed and exploded view of the AC magnetic position sensor 28 of FIGS. 1A and 1B. Magnetically soft substrate (preferably of manganese-zinc-ferrite or similar material) 30 has a plurality of raised linear teeth formed on its surface in patterns corresponding to and in juxtaposition with the square posts of the platen surface. Shown in the figure are a preferable arrangement of four groups of six teeth each, comprising four narrow teeth 35–38 and two wide teeth 32, 33. Substrate 30 can be formed by any number of manufacturing processes such as grinding, etching, machining, etc. Substrate 30 is mounted on non-magnetic base 50, preferably a ceramic of matching temperature coefficient, by means of adhesive 51. Rigid circuit board 53, containing a plurality of electrical connectors 54 is, in turn, mounted on base 50 by means of adhesive 52. Flexible printed circuit boards 40, (one of which is shown in FIG. 2) extending from connectors 54 of rigid circuit board 53, and corresponding to each group of raised teeth on substrate 30, containing multiple slots 42, each of which corresponds to an individual tooth of substrate 30, are adhered to substrate 30 by means of adhesive 41, thus forming a sensor group 44. Magnetically soft shield 60, preferably of µ-metal, formed in the shape of a box, is mounted, in turn, onto rigid circuit board 53 by means of adhesive 62. Electrical ground pin 55 is soldered to shield 60 at hole 61.

Figure 3A:
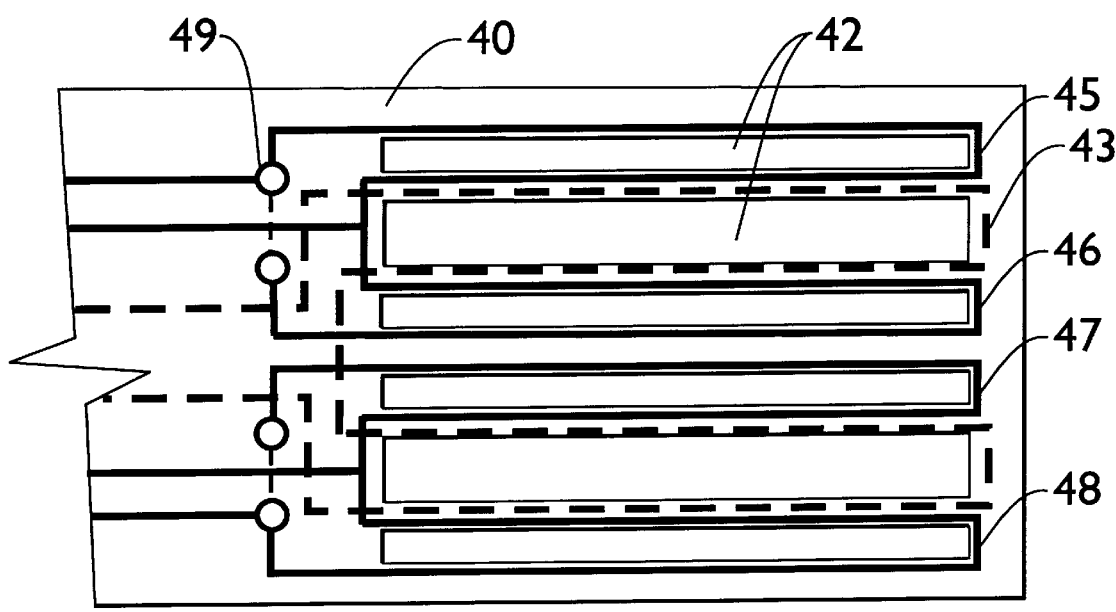
FIG. 3A shows the flexible printed circuit of region 44 of FIG. 2 using parallel sense windings.

FIG. 3A shows a closeup view of flexible printed circuit board 40 shown in FIG. 2. In another embodiment, a single flexible circuit board can be used with four wing-shaped tabs such as that shown in the figure. In particular are shown slots 42 formed in the insulating substrate of the flexible printed circuit board, single-turn drive winding 43 which encircles the two wide slots 42, and single-turn sense windings 45–48 encircling the four narrow slots 42 forming two independent circuits, each having their windings in parallel opposition. That is, windings 45 and 46 encircle their respective slots in opposite directions and are connected in parallel. Similarly, windings 47 and 48 encircle their respective slots in opposite directions and are connected in parallel. Drive and sense windings are preferably formed on opposite sides of 40, as indicated by dashed and solid lines in the figure. To facilitate connections, several vias 49 serve to connect top side wiring by bridging under other top side wires without contact.

Figure 3B:
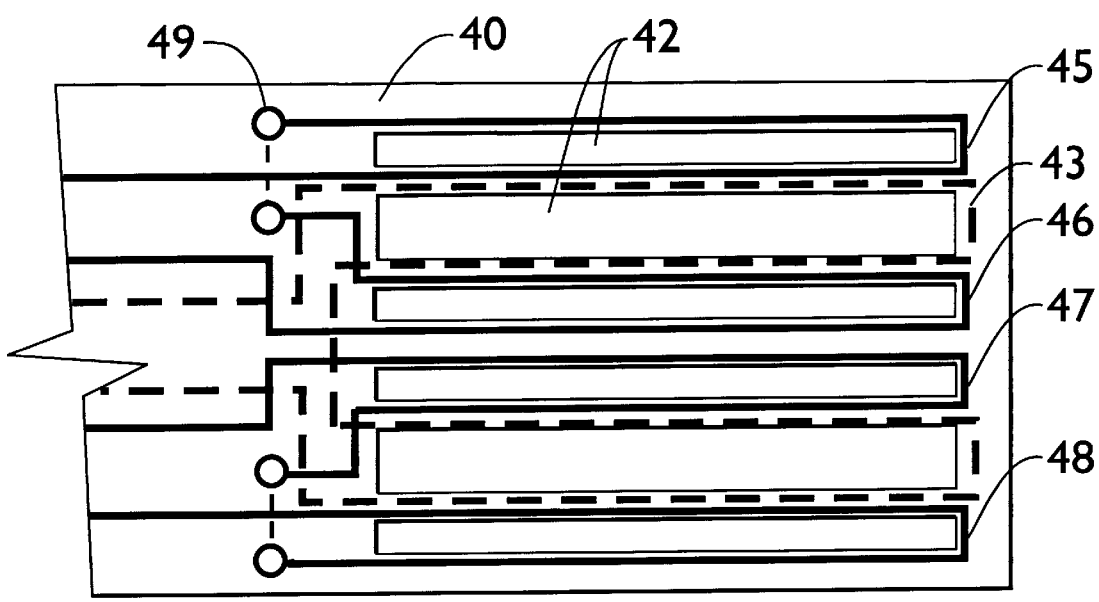
FIG. 3B shows the flexible printed circuit of region 44 of FIG. 2 using series sense windings.

FIG. 3B shows a closeup view of one of four alternatively wired flexible printed circuit boards 40 shown in FIG. 2. Here, single-turn sense windings 45–48 encircle the four narrow slots 42 forming two independent circuits, each having their windings in series opposition.

Figure 4:
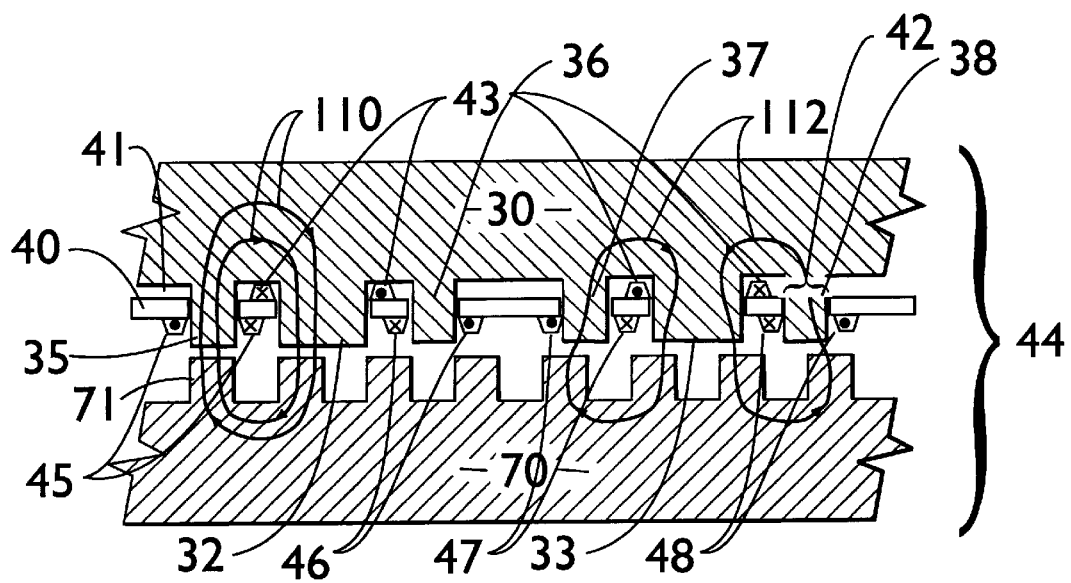
FIG. 4 is a cross-sectional view of one set of sensing elements of the sensor shown in FIG. 2.

FIG. 4 is a cross-sectional view of the sensor group 44 showing the juxtaposition of teeth with respect to platen 70. As previously discussed, soft magnetic substrate 30 preferably has a pattern of narrow teeth 35–38 and wide teeth 32, 33 formed on its surface, as shown in the figure. Flexible printed circuit board 40 with slots 42 is positioned over the teeth of substrate 30, in a manner which allows the teeth to protrude through the slots in the flexible circuit board, and is adhered to substrate 30 with adhesive 41. Flexible printed circuit board 40 carries drive windings 43 on one of its sides, and sense windings 45–48 on the other. (Dots (●) and crosses (X) shown on the printed wiring cross sections refer to their operation, discussed in the section following.) Iron platen teeth 71, nominally 0.020 in. wide spaced in a square grid of pitch 0.040 in. as previously discussed, are in close proximity to, and in juxtaposition with, the teeth of substrate 30.

Figure 5:
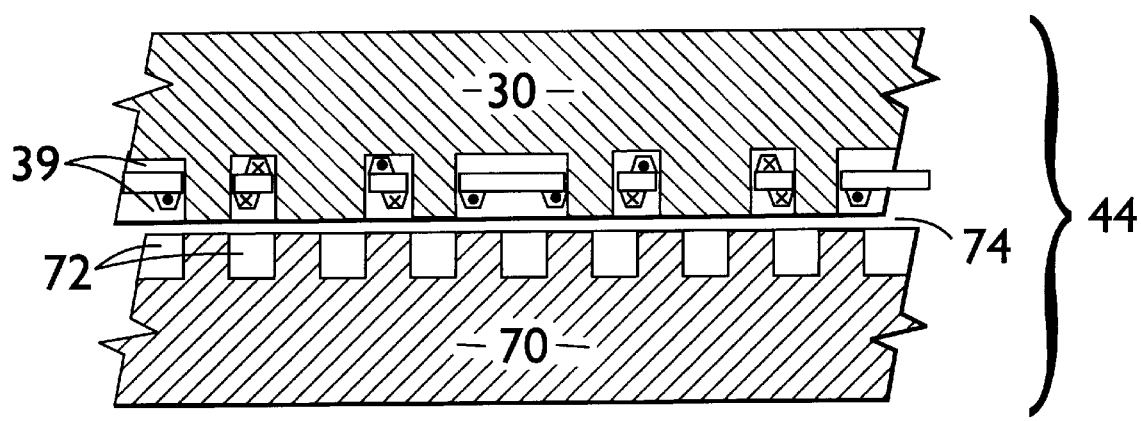
FIG. 5 is a cross-sectional view of one set of sensing elements after planarization to form an air bearing.

FIG. 5 shows sensor group 44 with substrate 30 and platen 70 after the platen teeth have been back-filled and planarized with a non-magnetic material 72, and substrate 30 has also been back-filled and planarized with a non-magnetic material 39, preferably epoxy, to form air bearing gap 74.

Figure 6:
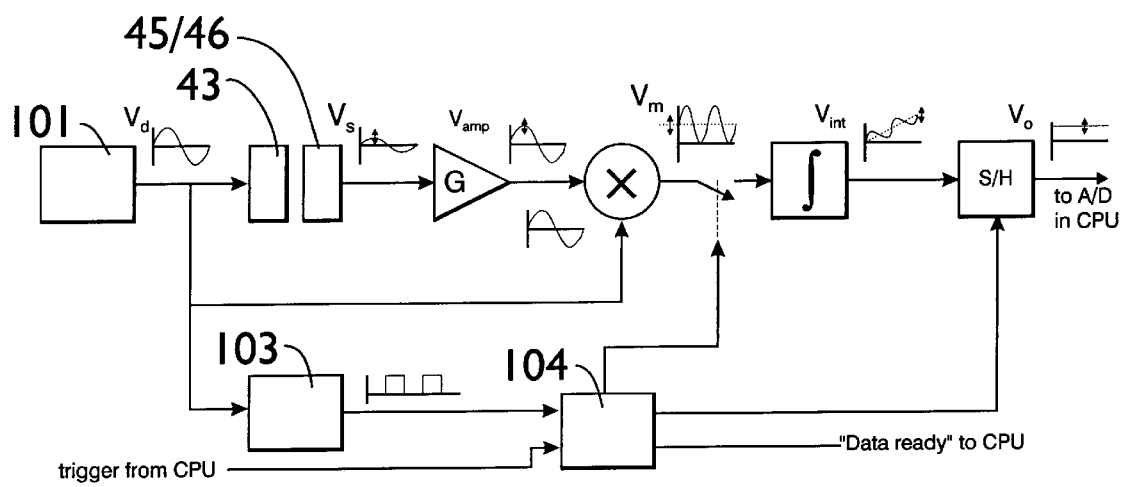
FIG. 6 shows a block diagram of the AC magnetic position/orientation sensor electronic circuit.

FIG. 6 is a preferred embodiment block diagram of the electronic processing circuitry 29 associated with AC magnetic position/orientation sensor 28. Sine-wave oscillator 101 connects to AC magnetic sensor drive windings 43, connects to clock generator 103, and connects to an analog multiplier, indicated by a circle with a "X" inside. Sensor wires from sense windings 45/46, (or, in another case, from sense windings 47/48) connect to gain block G. Gain block G is connected to the analog multiplier. The analog multiplier is connected to a high-speed electronic switch. The electronic switch output is connected to an integrator block. The control input of the electronic switch is connected to an output of digital timing block 104. Block 104 is comprised of several logic gates and flip flops and is detailed in FIG. 7. Digital timing block 104 has an input wire from the CPU of the aforementioned computer, and an input wire from clock generator 103. The output wire of the integrator block is connected to a sample and hold (S/H) block. The control input of the S/H block is connected to another output from digital timing block 104. The output wire of the S/H block is connected to the analog-to-digital (A/D) converter attached to the CPU of the computer. Yet another output wire from digital timing block 104 connects to the CPU.

Figure 7:
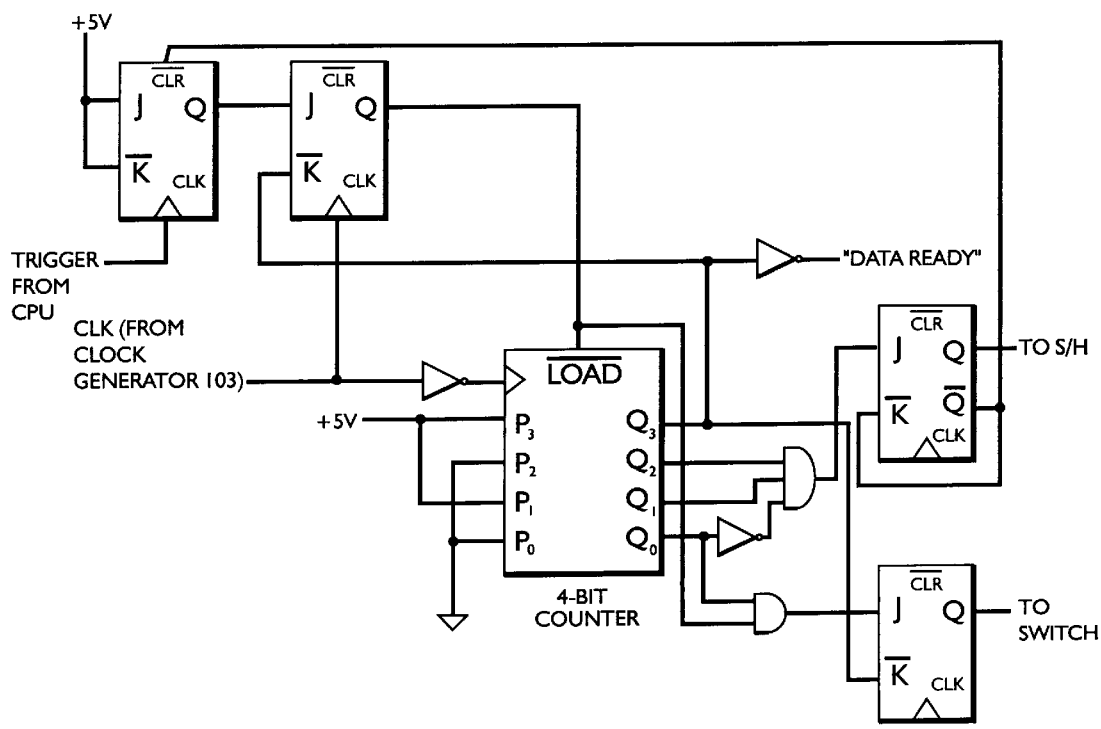
FIG. 7 shows a schematic diagram of digital timing block 104 shown in FIG. 6.

FIG. 7 shows a schematic diagram of the contents of digital timing block 104 referred to in FIG. 6. Since the circuit consists of standard digital logic elements commonly available and readily understandable by those persons skilled in the art, no further exposition is presented here.

Figure 9:
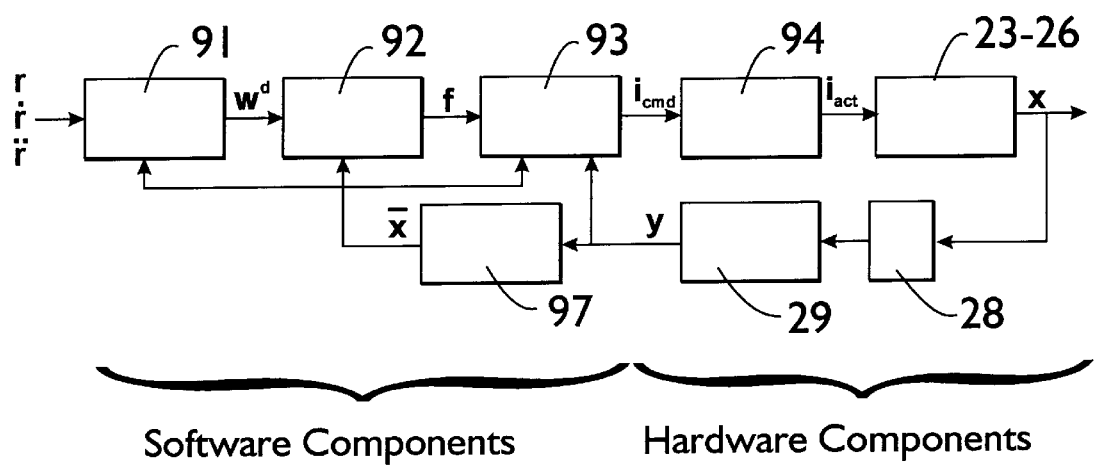
FIG. 9 shows a block diagram of the computer controller.

FIG. 9 shows the controller block diagram, comprised of software and hardware components. Block 91 is a Proportional-Integral-Differential (PID) control algorithm well known in the art. Its output is connected to force resolution block 92. Output from force resolution block 92 is connected to commutator block 93. Output from commutator block 93 is connected to standard motor amplifiers 94. The amplifier outputs are connected to the motor windings in planar motor forcer motor segments 23–26. Sensor electronics board 29 (see FIG. 6), which receives input from the AC magnetic position/orientation sensor 28, physically integral to the forcer (illustrated by block containing 23–26) has outputs which are connected to commutator 93 and estimator 97. Outputs from estimator 97 are connected to PID block 91, force resolution block 92, and commutator block 93, as previously introduced.

OPERATION OF THE INVENTION—FIGS. 1A, 1B, 2, 4, 6, 8A, 8B, 9–11

FIGS. 1A and 1B are overall views of the closed-loop planar motor forcer with integral AC magnetic position/orientation sensor.

Referring to FIG. 1A, it may be appreciated that planar motors generally operate in open-loop stepping mode without any sensing of their position along the platen surface. This closed-loop planar motor with integral three-degree-of-freedom (DOF) alternating current (AC) position/orientation sensor shown in FIG. 1A modifies this condition with the introduction of a position and orientation sensor 28, located in the otherwise unused center of the planar linear motor housing 20. Thus as the forcer moves over the platen surface, the integral position sensor 28 generates weak alternating current electrical signals indicative of its precise position in two orthogonal translational directions, as well as its orientation on the plane (within a small rotation angle of approximately ±20).

FIG. 1B shows an overhead view of the hardware part of the closed-loop planar motor forcer with integral AC magnetic position/orientation sensor showing the upper extent of the motor segments 23–26 and integral position/orientation sensor 28. Electronic circuit board 29 processes and amplifies electrical signals from AC magnetic position/orientation sensor 28, (See FIG. 6) to provide precise position and orientation information and communicates these signals through connector 21 and thence through tether 22 to the computer. This information, in turn, along with desired position and orientation information supplied by the user in an application, are combined by a control algorithm (see FIG. 9) to produce appropriate control signals which, through conventional power amplifiers, produce appropriate currents in the forcer's linear motor windings, thereby affecting closed-loop control. The action of sensing, processing, control, and actuation occurs in a loop typically at the rate of several thousand times per second.

FIG. 2 shows a detailed and exploded view of the AC magnetic position/orientation sensor 28 of FIGS. 1A and 1B. Of particular interest are the four sensor groups, such as 44, formed on monolithic substrate 30. Operation of each sensor group is detailed in paragraphs which follow. For the present explanation, suffice it to say that each sensor group provides the ability to measure displacement with respect to the platen 70 in directions orthogonal to the long axes of the teeth (such as 35–38, 32–33), while being substantially insensitive to displacement in line with the long axes. Position output from pairs of sensor groups located diagonally opposite from one another on substrate 30, when averaged, yield position measurements in the orthogonal directions X and Y (aligned with the sides of housing 20 and also with the force directions of linear motor segments 23–26), whereas rotational orientation information is derived by subtracting position measurements of diagonally opposite sensor groups. This gives the ability to measure all three degrees of freedom (DOF) in the plane, using a single monolithic sensor structure 28.

FIG. 4 is a cross-sectional view of sensor group 44 showing the juxtaposition of teeth with respect to platen 70. Dots (●) and crosses (X) shown on the printed wiring cross sections indicate the sense of current flow. Dots indicate current flowing out of the page, whereas crosses indicate current flowing into the page, for each respective winding. Currents are alternating, hence the roles of dots and crosses alternate. In operation, substrate 30 moves over platen 70 and may thus assume any position with respect to teeth 71. In FIG. 4, a particularly illustrative position is chosen. Here, the leftmost (sense) first tooth 35 of 30 is aligned with a tooth 71. The second (drive) tooth 32 overlaps the next platen tooth by 50%. The third (sense) tooth 36 aligns with a gap between platen teeth. In this alignment condition, a large portion of magnetic flux lines 110 generated by drive winding 43 will pass through the leftmost sense winding 45 and a much smaller flux will pass through sense winding 46. (Of substrate 30 is positioned one tooth spacing to the right, the reverse condition will obtain.) Also shown in the figure are a rightmost set of teeth comprised of drive tooth 33 and pair of sense teeth 37 and 38 which are positioned 1.25 pitches distant from the leftmost set. In this set, drive winding 43 generates approximately equal magnetic fluxes 112 in the two sense windings 47 and 48. The arrangement of the two sets of teeth are said to be in "quadrature" relationship. Thus as the planar motor forcer with integrated AC magnetic position/orientation sensor moves over the platen surface, an induced AC current or voltage in the winding comprised of 45 and 46, connected in series or parallel opposition, varies approximately as a sine function of position along the platen, owing to the variable inductive coupling with platen teeth 71, while an induced AC current or voltage in the winding comprised of 47 and 48, also connected in series or parallel opposition, varies approximately as a cosine function of position. These conditions obtain simultaneously for each of the four sensor groups 44 associated with the single monolithic substrate 30. The combination of four groups of sine and cosine functions of position permits unambiguous measurement of all 3 DOFs in the plane.

FIG. 6 is a preferred embodiment block diagram of electronic processing circuitry 29 associated with AC magnetic position/orientation sensor 28. Sine-wave oscillator 101 drives AC magnetic sensor drive windings 43, drives clock generator 103, and drives an analog multiplier, indicated by a circle with a "X" inside. A preferred frequency of operation is approximately 100 kHz. Output waveforms from each block are indicated in the diagram. Sensor signals $V_s$ from sense winding 45/46 are amplified in gain block G and sent to the multiplier. Multiplication of the drive signal $V_d$ by the amplified sense winding signal $V_{amp}$ produces the level-shifted output waveform $V_m$. Signal $V_m$ is intermittently chopped by the electronic switch and passed to the integrator block. The open and closed state of the switch is determined by the output of digital timing block 104. Block 104 consists of several logic gates and flip flops whose operation can be readily understood by examination of FIG. 7. Operation of 104 is controlled by a trigger signal from the CPU of the aforementioned computer, and by the output from clock generator 103. Output $V_{int}$ from the integrator is a steadily rising waveform which is captured by the sample and hold (SAF) block after precisely n periods of the waveform have passed, as determined by a signal from digital timing block 104. The value of integer constant n is determined by a setting within block 104. The (periodically) sampled output waveform $V_o$ is a direct current (DC) value indicative of precise position along the platen surface (in the absence of relative motion between the closed loop planar motor forcer and the platen) which is sent to the analog-to-digital (A/D) converter attached to the CPU of the computer. Digital timing block 104 also provides a "data ready" signal to the CPU which allows the A/D to convert $V_o$ at the correct time. The electronic processing thus described is known in the art as a "gated integration" approach, which has proved to be useful for extracting weak signals in the presence of noise.

Figure 8A:
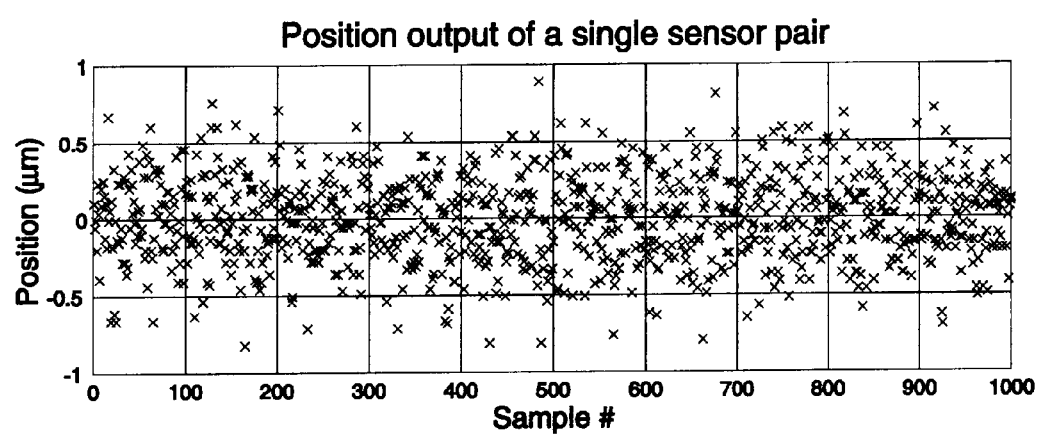
FIG. 8A shows the measured sensor position output vs. time for a number of samples.

FIG. 8A shows the measured operating performance of a prototype implementation of the integral 3-DOF AC magnetic position/orientation sensor 28. Plotted on the vertical axis in the graph of FIG. 8A are a series of position values measured in µm, as output from sensor electronics board 29. The horizontal axis of the graph is the sample number. Data were taken with the planar motor forcer at a fixed position with respect to the platen 70. As can be seen from the graph, in no case in over 1000 sampled data points did the position value differ from the ideal zero value by more than ±1 µm. This value is approximately one part in 1000 of the pitch distance between platen teeth 71. This result indicates that the sensor and associated circuitry operate with a high degree of precision.

Figure 8B:
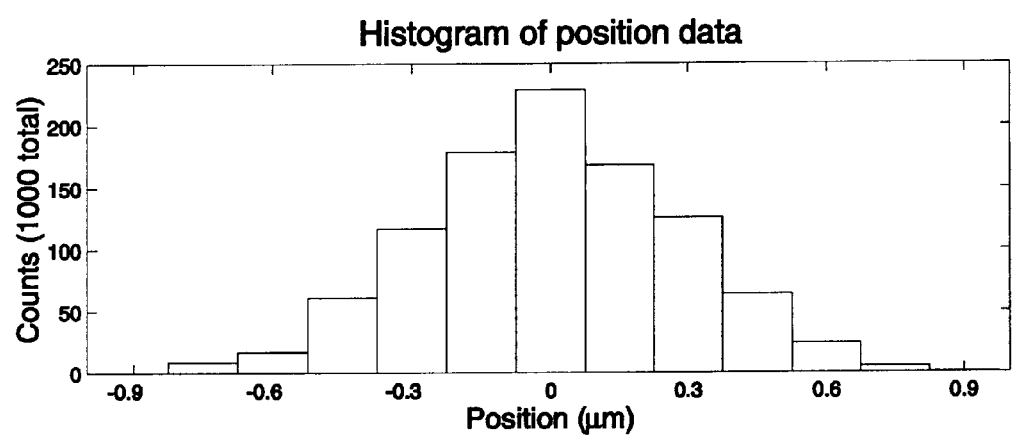
FIG. 8B shows a histogram of the data samples shown in FIG. 8A.

FIG. 8B is a histogram plot of the sensor data presented in FIG. 8A. Plotted on the vertical axis in the graph of FIG. 8B are the number of data points falling within each bin of the histogram. The horizontal axis of the graph is the deviation from the ideal zero value, in µm. It can be seen that the distribution of data is essentially Gaussian, indicating the absence of systematic error. The standard deviation a associated with a Gaussian fit of these data yields a value of σ=0.2 µm. That is, in approximately 68% of the cases, the position output can be expected to lie within 0.2µm of zero, a distance of one part in 5000 of the pitch distance between platen teeth 71. Similarly, for orientation, it was found that σ=0.001° or better.

Figure 10:
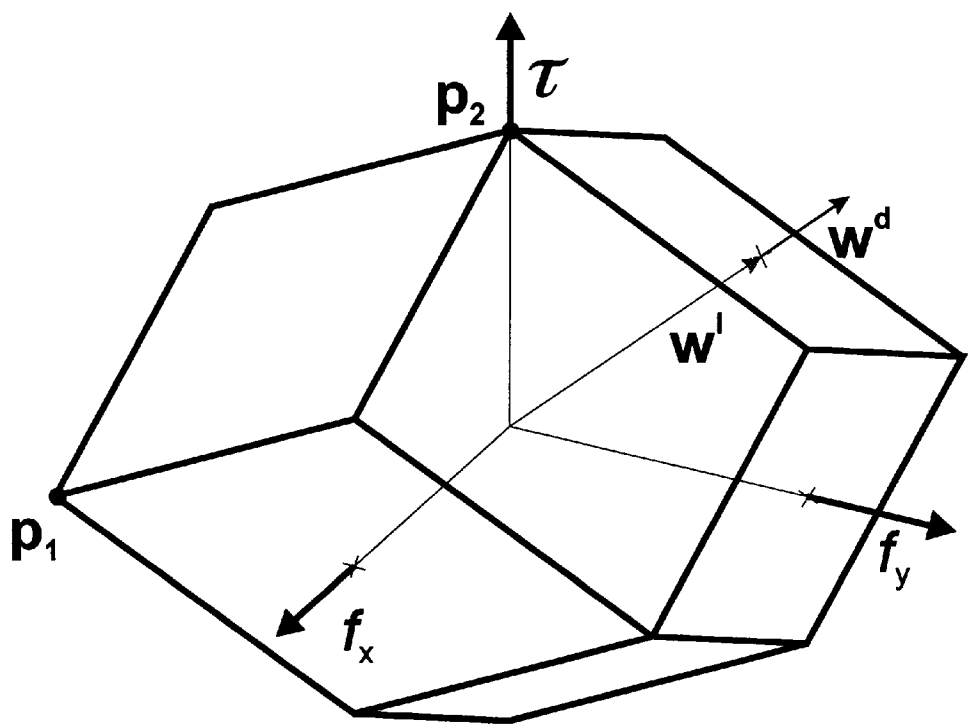
FIG. 10 shows an abstract geometric representation of the force resolution block 92 of FIG. 9.

FIG. 9 shows the controller block diagram, comprised of software and hardware components. Block 91 is a Proportional-Integral-Derivative (PID) control algorithm well known in the art. It receives as input a user reference trajectory for the planar motor forcer denoted by position $\underline{r}$ and its time derivatives, as well as a state estimate $\bar{x}$, consisting of an estimate of the position, orientation and velocity of the planar motor forcer. Both the state estimate $\bar{x}$ and trajectory r are expressed relative to the center of mass of the forcer, to allow for a decoupled controller, which can consider each direction of motion independently. Based on the difference between state estimate $\bar{x}$ and the reference trajectory r, and the integral of this difference, a classical PID control equation well known in the art is used to compute a desired "wrench" $w^d$ vector of forces and torque which is sent to force resolution block 92. Force resolution block 92 is used to map the three-element wrench vector $w^d$ to a vector f of four force commands, one for each of the forcer motor segments 23–26. This block is required to solve this underconstrained mapping problem, as well as handle the case where PID controller 91 demands more force or torque than can be generated by the planar motor forcer. The operation of 92 is detailed in FIG. 10, which is a three dimensional geometric representation of the force and torque limits of the planar motor forcer given an upper and lower limit on each of the four forcer motor segments 23–26. If a wrench vector from PID controller 91, such as $w^d$ shown in FIG. 10, lies outside this envelope and cannot be generated by the planar motor forcer, force resolution block 92 scales the vector to wrench $w^l$, which the planar motor forcer is capable of generating. After computing $w^l$, the vector of motor segment forces f is computed using a relation that ensures that wrench $w^l$ is generated without exceeding the maximum force capabilities of any of the motor segments. This relation is defined in the preferred embodiment to minimize the maximum of the motor segment forces, although minimization of other functions of the motor segment forces is also acceptable, for example, minimization of total power dissipation in the motor segments. Referring to FIG. 9, vector f is then sent to commutator block 93, which determines the appropriate set of motor drive current values $i_{cmd}$ based on f, the sensor position measurement y, and the velocity estimate contained in $\bar{x}$. Commutation is well known in the art, but commutator block 93 is implemented in software instead of hardware or electronics, allowing consideration of the planar motor forcer rotation and a more complex model of force generation by the forcer motor segments 23–26. The commutator sends a current command $i_{cmd}$ to the commercially available pulse-width-modulation (PWM) motor amplifiers 94. The amplifiers send currents $i_{act}$ to the motor windings in forcer motor segments 23–26. As motion occurs, the position X changes and is measured by integrated AC magnetic position/orientation sensor 28 and its associated electronic circuit board 29 (FIGS. 6, 7). Measured position y is used by state estimator 97, also well known in the art, which uses a dynamic model of the planar motor forcer to compute state estimate $\bar{x}$, including positions and velocities, based on the sensor position measurement y. All of the operations performed by the electronic circuit board 29 (FIGS. 6, 7) and controller FIG. 9 are performed at a speed sufficiently high to allow planar motor forcer speeds of several m/s, and positioning to sub-µm resolutions, even in the presence of disturbances.

Figure 11:
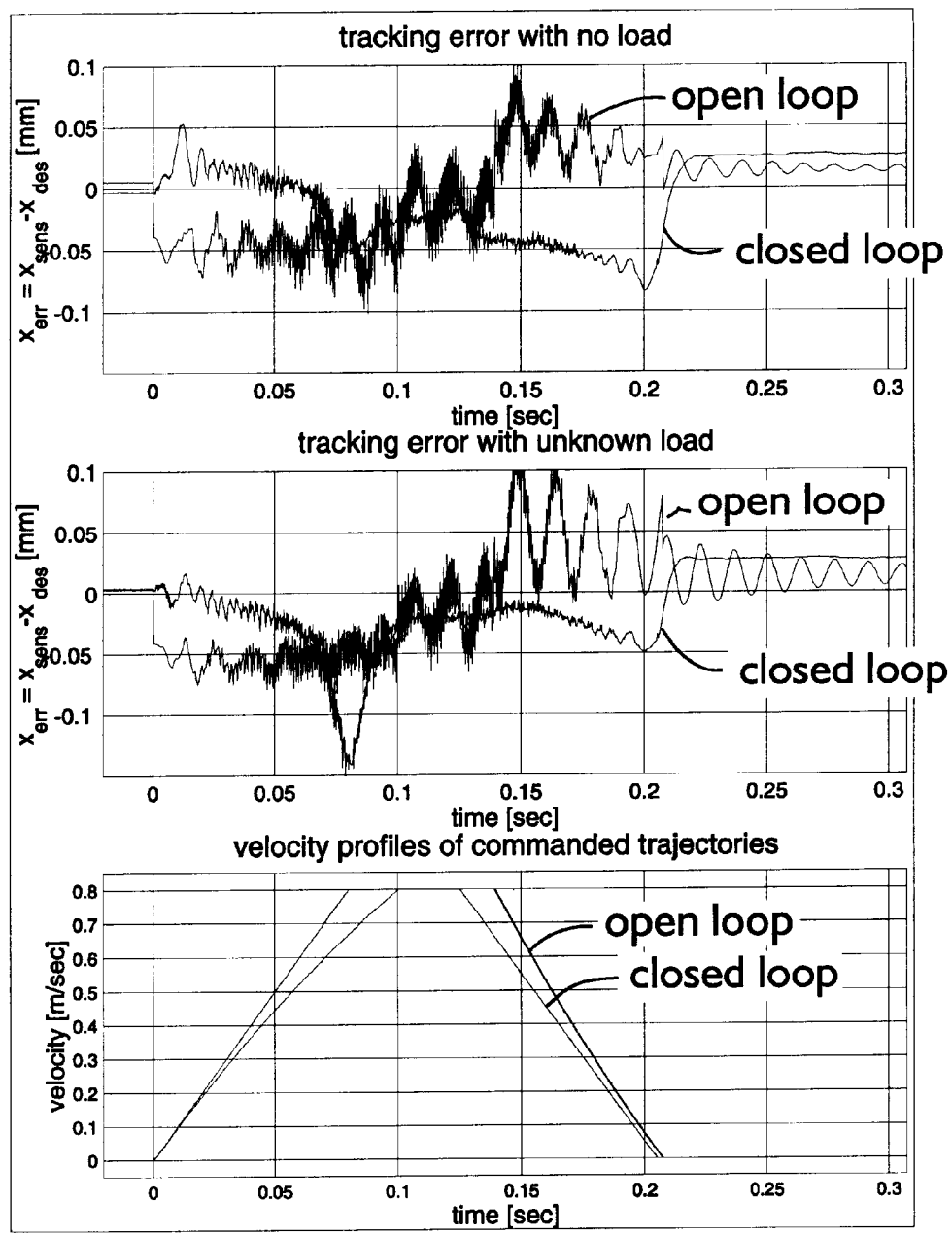
FIG. 11 shows the performance obtained with the closed-loop planar linear motor.

FIG. 11 shows the result of two typical motion trajectory tracking experiments performed on the planar motor forcer. These graphs serve to illustrate the operating benefits of the closed-loop planar motor with integral AC magnetic position/orientation sensor. The bottom graph of FIG. 11 shows velocities (speeds) of commanded trajectories in units of meters per second (m/s) vs. time in seconds. The top graph shows the deviation, or tracking error, of the actual position from the commanded position in units of millimeters (mm) vs. time, for the case of no payload being carried by the planar motor forcer. The middle graph shows the deviation between actual and commanded positions, for the case of an unknown payload being carried by the planar motor forcer. In each of the three graphs, there are two traces plotted, as measured by a highly precise Zygo interferometer system. One of the traces in each graph corresponds to operation of the planar linear motor in "open loop" mode—i.e. by disabling the sensing and control functions of the closed-loop planar motor. The other trace in each graph corresponds to operation in "closed-loop" mode—i.e. by incorporating all features of the closed-loop planar motor. From the top and middle graphs, it is apparent that operation in open-loop and closed-loop manner produces different tracking errors. In particular, it is evident that closed-loop mode provides a reduction in tracking error compared to open-loop mode, and cessation of motion after the trajectory is complete is far better compared to open-loop mode. The latter can easily be seen in the right portions of each graph, where the open-loop case results in oscillation and long settling times, whereas the closed-loop motion ceases smoothly and stays constant (nearly straight horizontal curve).

The closed-loop planar motor thus described has many important applications in industry where it is required to move a payload along a controlled path in the plane (in complex curves or straight-line) at high speeds (up to several meters per second) and subsequently to precisely position (with sub-$\mu$m resolution) and orient (with sub-millidegree resolution) the payload prior to performing a task. Additionally, the closed-loop planar motor forcer can exert controlled forces and torques on any object it is in contact with, or can emulate the operation of a hardware spring and damper combination using techniques well known in the control art.

Having thus described the invention, what is claimed as new and what is desired to be secured by Letters Patent is:

1. A precision closed-loop planar motor comprising:
   (a) stator means established by a platen comprising a plurality of ferromagnetic teeth spaced regularly in an orthogonal grid surrounded by nonmagnetic material and having a flat surface;
   (b) forcer means establishing a movable rigid body comprising a plurality of linear motor segment means in operative juxtaposition with said ferromagnetic teeth and within a housing having a flat surface supporting air bearing means in juxtaposition with the said flat surface of said stator means and incorporating translational and rotational alternating current magnetic sensor means for detecting the presence of said ferromagnetic teeth and providing signals indicative of their mutual planar geometric relationships;
   (c) electronic processing means operatively interposed between said translational and rotational alternating current magnetic sensor means and a controller means (d), whereby position and orientation information of said forcer means with respect to said orthogonal grid is obtained and conveyed by wires to said controller means;
   (d) controller means operatively connecting said linear motor segment means with position and orientation information from said electronic processing means so as to provide motive power to said linear motor segment means in response to programmed commands from a user of said closed-loop planar motor, thereby establishing feedback control means which is closed-loop;
   whereby precise translational motion and precise limited rotational motion in the plane is affected.

2. The precision closed-loop planar motor according to claim 1, wherein said forcer means incorporates said alternating current magnetic sensor means wherein:
   (a) said magnetic sensor is centrally disposed with respect to said linear motor segment means;
   (b) said magnetic sensor comprises a single magnetic substrate with a plurality of raised teeth each of which is encircled by at least one electrical drive winding connected to alternating current drive means or at least one electrical sense winding;
   (c) said raised teeth occur in orthogonal groups in substantial alignment with each of the orthogonal axes of ferromagnetic teeth in said stator means;
   whereby signals indicative of the mutual relationships in both position and orientation between said stator teeth and said sensor teeth are obtained.

3. The precision closed-loop planar motor according to claim 2, wherein said alternating current sensing means is openly exposed on its face in juxtaposition with the flat surface of said stator means, and substantially enclosed on its sides perpendicular to said surface of said stator means and its top, opposite said surface of said stator means, by magnetic shielding material.

4. The precision closed-loop planar motor according to claim 2, wherein said drive windings or said sense windings are carried by at least one flexible circuit board means wherein:
   (a) said circuit board incorporates a plurality of slots permitting said raised teeth of said magnetic substrate to protrude substantially through said slots;
   (b) said circuit board is rigidly affixed to the planar surface of said magnetic substrate means at a plane defined by the bases of said plurality of raised teeth;
   (c) said circuit board with said drive and said sense windings and said slots in combination with said teeth of said magnetic substrate form a substantially rigid and precisely defined magnetic and electrical structure;
   whereby signals of very high precision indicative of the mutual relationships between said stator teeth and said sensor teeth are obtained.

5. The precision closed-loop planar motor according to claim 4, wherein said drive windings and said sense windings are on opposite sides of said flexible circuit board means.

6. The precision closed-loop planar motor according to claim 4, wherein one or more of said magnetic substrate teeth with said drive windings in said orthogonal group remain substantially juxtaposed with one or more teeth of said stator means regardless of the position of said forcer means on said stator means, and wherein one or more said magnetic substrate teeth with said sense windings of said orthogonal group are arranged in two subgroups, each of which are positioned one or more tooth pitches of said stator means from said one or more teeth of said drive windings and spaced with respect to each other a distance corresponding to an integral number of pitches of said stator teeth plus an additional one-fourth pitch of said stator teeth.

7. The precision closed-loop planar motor according to claim 6, wherein said sense windings of said subgroups within said orthogonal group are connected in parallel opposition.

8. The precision closed-loop planar motor according to claim 1, wherein said electronic processing means comprises functional blocks including at least one gated integration block providing an integration of said alternating current magnetic sensor signals over precisely an integral number of periods of said alternating current drive means.

9. The precision closed-loop planar motor according to claim 1, wherein said controller means comprises computational blocks including at least one force resolution block mapping said position and orientation information into values of electric currents for said linear motor segment means.

10. A precision closed-loop planar motor comprising:
(a) stator means forming a stationary planar part incorporating a plurality of ferromagnetic teeth providing passive magnetic reaction forces and providing a passive orthogonal array of precision position reference features;
(b) forcer means establishing a movable rigid body comprising a plurality of linear motor segment means providing active electromagnetic forces in orthogonal directions and active electromagnetic torque with respect to said stator means, air bearing means providing frictionless support with respect to said stator means, and translational and rotational alternating current magnetic sensor means providing signals descriptive of the position and orientation of said rigid body with respect to said stator means;
(c) electronic processing means serving to convert said alternating current magnetic sensor means said signals to position and orientation information of said forcer means with respect to said orthogonal grid;
(d) controller means combining position and orientation information from said electronic processing means with programmed commands from a user of said closed-loop planar motor, energizing said linear motor segment means thereby producing controlled forces and torques between said forcer and said stator;

whereby precise translational motion and precise limited rotational motion in the plane is affected.

11. The precision closed-loop planar motor according to claim 10, wherein said forcer means incorporates said alternating current magnetic sensor means wherein:
(a) alternating current drive magnetic fields are caused to operatively couple into said ferromagnetic teeth of said stator means;
(b) alternating current sense magnetic fields indicative of rotation and translation of said forcer are inductively received from said ferromagnetic teeth of said stator means;

whereby signals indicative of the mutual relationships in both position and orientation between said stator teeth and said sensor teeth are obtained.

* * * * *

UNITED STATES PATENT AND TRADEMARK OFFICE
CERTIFICATE OF CORRECTION

PATENT NO. : 6,175,169 B1   Page 1 of 1
DATED : January 16, 2001
INVENTOR(S) : Ralph L. Hollis, Jr., Zachary J. Butler, Alfred A. Rizzi, Arthur E. Quaid III It is certified that error appears in the above-identified patent and that said Letters Patent is hereby corrected as shown below:

<u>Title Page,</u>
Item [75], change "Arthur E. Quard III" to -- Arthur E. Quaid III --.

<u>Column 9,</u>
Line 47, change "±20)" to -- ±2° --.

<u>Column 10,</u>
Line 36, change "Of substrate" to -- If substrate --.

<u>Column 11,</u>
Line 13, change "(SAF)" to -- (S/H) --.
Line 48, change "deviation a" to -- deviation $\sigma$ --.

Signed and Sealed this

Twenty-fifth Day of September, 2001

Attest:

*Attesting Officer*

NICHOLAS P. GODICI
*Acting Director of the United States Patent and Trademark Office*